United States Patent [19]
Wagner

[11] 4,176,908
[45] Dec. 4, 1979

[54] DEVICES FOR MONITORING, SWITCHING, ATTENUATING OR DISTRIBUTING LIGHT

[75] Inventor: Richard E. Wagner, Fair Haven, N.J.

[73] Assignee: Bell Telephone Laboratories, Incorporated, Murray Hill, N.J.

[21] Appl. No.: 860,155

[22] Filed: Dec. 14, 1977

[51] Int. Cl.$^2$ .............................................. G02B 5/14
[52] U.S. Cl. .............................. 350/96.15; 350/96.20
[58] Field of Search ................ 350/96.15, 96.16, 96.20

[56] References Cited

U.S. PATENT DOCUMENTS

| | | | |
|---|---|---|---|
| 3,453,036 | 7/1969 | Swope et al. | 350/96.16 |
| 3,870,398 | 3/1975 | Love | 350/96.16 |
| 4,011,005 | 3/1977 | Hawkes et al. | 350/96.16 |

OTHER PUBLICATIONS

Bloem et al., "Fiber-Optic Coupler", *IBM Tech. Disc. Bulletin*, vol. 16, No. 1, Jun. 1973, pp. 146-177.
Yamamoto et al., *Proceedings of the IEEE*, Jun. 1976, pp. 1013-1014.
"Integrated Optics: An Introduction", Bell System Tech. Jour., vol. 48, pp. 2059-2069, Sep. 1969.
National Conv. Inst. of Comm. and EE of Japan, No. 919, p. 4-223, Mar. 1977.

*Primary Examiner*—Stewart J. Levy
*Attorney, Agent, or Firm*—Richard B. Havill

[57] ABSTRACT

An access port, a basic building block for optical devices, is formed by joining the ends of two fibers. Each fiber has a wedge-shaped end portion with two planar sides. One planar side of one end portion is held against one planar side of the other end portion. The other planar side of each end portion controls transmission of light from the first fiber to the second fiber.

Optical devices for monitoring, switching, attenuating or distributing the light transmitted through the first fiber advantageously use the access port.

20 Claims, 10 Drawing Figures

DEVICES FOR MONITORING, SWITCHING, ATTENUATING OR DISTRIBUTING LIGHT

BACKGROUND OF THE INVENTION

This invention relates to fiber optic devices and, more particularly, to devices for monitoring, switching, attenuating or distributing optical signals in fibers.

Optical transmission systems are being developed to handle large amounts of communications traffic. One type of optical transmission system uses optical fibers as the transmitting media. Optical fibers with sufficiently low loss for practical long distance optical communication systems have been developed only recently.

Any communication system requires both transmitting and receiving apparatus. It is desirable that the transmitting source have a constant power output that is independent of temperature changes and component aging. One source of optical power is a laser which changes output power in response to changes of both temperature and aging. Output power of the laser can be stabilized by monitoring the light actually coupled into the fiber and by using such light to develop a signal for feedback control of the laser. To effectively monitor such light in the fiber for controlling the laser, a tap should monitor the transmitted light without altering the characteristic of the transmitted power. All transmitted modes should be monitored equally because any substantial preference of one mode or modes over another mode or modes is unsuitable for accurate feedback control of the laser. Available fiber optic taps substantially prefer one optical mode or modes over another mode or modes.

Fiber optic systems need optical tap devices for economically monitoring and controlling the optical power. A wide variety of devices are being developed to fill these needs. Development of a device may result in a specific and perhaps optimum component for each particular application. Such a specific development can be costly. As an alternative a designer may desire to convert the optical signal to an electrical signal and process the latter electronically taking advantage of well developed and versatile electronic technology. This electronic approach introduces noise into the system as well as requiring a source of external power.

Problems created by developing specific components for each application and by converting optical signals to electronic signals for processing are avoided by the use of an optical fiber access port in a tap for monitoring and controlling optical power and for building many optical control devices without substantial further development effort regardless of changes introduced by new fiber materials and structures.

A practical optical communications system requires at least a few different optical devices for establishing desirable interconnection arrangements. Optical switches can be used so that part of the system can be rearranged conveniently either for testing or for providing a variety of communications needs. Additionally, a variable optical attenuator can be used for adjusting the magnitude of power being transmitted in any part of the system. Such attenuators are helpful in setting levels for testing and for establishing some branching arrangements. Another device which facilitates the design of optical communication systems is a multibranch distributor. Such a distributor divides incident light, transmitted along one fiber, into portions for further transmission along two or more other fibers.

As in the case of the optical fiber tap, the variable attenuator and the multiple branch distributor should perform their designated functions without substantial preference of some mode or modes over another mode or modes. Accurate transmission of information often requires faithful communication of the input signal characteristic throughout the system.

Available fiber optic devices are relatively complicated and expensive devices whereas it is desirable for reasons of cost and ease of operation to have simple, inexpensive fiber optic devices. Such simple, inexpensive devices enhance the practicality of optical communications systems arrangements.

These problems of complicated design, high cost and mode selectivity of the existing fiber optical devices are solved by a group of fiber optic devices, each including an access port.

It is an object to provide a family of simple fiber optic devices for coupling optical power between fibers.

It is a further object to provide fiber optic devices which are substantially insensitive to optical modes carried by a fiber.

It is another object to provide a basic unit for constructing different optical control devices.

SUMMARY OF THE INVENTION

These and other objects are achieved by an access port formed by joining the ends of two fibers. Each fiber has a wedge-shaped end portion with two planar sides. One planar side of one end portion is held against one planar side of the other end portion. The other planar side of each end portion controls transmission of light from the first fiber to the second fiber.

Depending upon what medium is placed adjacent to an optical boundary created at the other planar side of each end portion in a specific device, the device operates either to monitor, switch, attenuate or distribute the light transmitted through the first fiber.

It is a feature of the invention to take wedge-shaped end portions of two fibers and to hold one planar side of one end portion against one planar side of the other end portion.

It is another feature to form an optical boundary at the other planar sides of the wedge-shaped end portions for coupling light out of or into one of or both of the fibers.

It is another feature to place various materials or another access port adjacent to the optical boundary for controlling transmission of light through the two fibers.

It is a further feature to move material or another access port adjacent to the boundary for changing optical coupling across the boundary.

BRIEF DESCRIPTION OF THE DRAWINGS

The subject invention may be more readily understood by reference to the following detailed description when that description is read with reference to the attached drawings wherein.

DETAILED DESCRIPTION

Access Port

Figure 1:
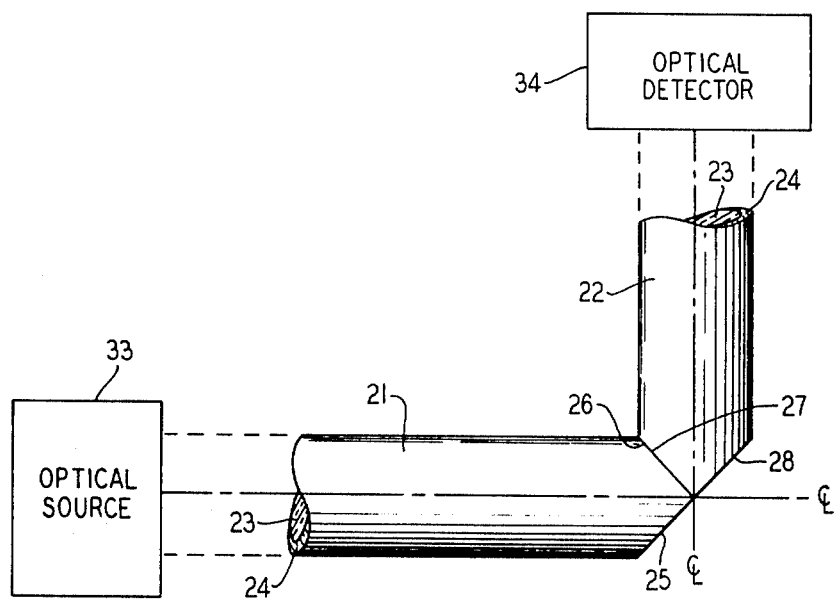
FIG. 1 is a diagram of an access port.

Referring now to FIG. 1, there is shown a multimode optical fiber access port which is a basic structure used to build several devices for coupling light into or out of a transmitting fiber without introducing significant loss and without affecting the transmission properties of the fiber. As shown in FIG. 1, the access port is a device including a pair of multimode optical fibers 21 and 22. Thus it is a two-port device typically having one port, or fiber, for receiving light from a source and another port, or fiber, for transmitting light on to a receiver, a detector or a control circuit. The name access port derives from use of an optical boundary in the device as another port for coupling light into or out of the device. This optical boundary port is common to all of the devices so only input and output ports through a fiber are used to designate the number of ports of any specific device hereinafter.

The fibers are of the graded index type and may be produced by a modified chemical vapor deposition process described in "Better Glass Fibers for Optical Transmissions," *Bell Laboratories Record*, September 1975, pages 340–345. Each fiber has a core 23 which is approximately 50 micrometers in diameter and is surrounded by cladding 24 having an outer diameter of approximately 100 micrometers. Although this description assumes a graded index type of multimode fiber, other types of fiber such as stepped index fibers and single mode fibers can be used in access ports.

One end portion of each fiber is formed into a wedge shape so that the two fibers can be joined together at those ends with an angle, which is shown as a right angle, between their longitudinal axes. Other angles can be used advantageously. The wedge-shaped end portion of fiber 21 has two planar sides, or facets, 25 and 26. The end portion of fiber 22 also has two planar sides, or facets, 27 and 28. The planar sides 25 and 26 intersect with one another in a line which is perpendicular to the surface upon which FIG. 1 is drawn. The sides 27 and 28 intersect in a similar line. Although the lines of intersection are shown perpendicular to the surface in FIG. 1, they may be at other angles. The sides 25, 27 and 28, the line of intersection 31 between the sides 25 and 26, and the line of intersection 32 between the sides 27 and 28 are shown more clearly in FIG. 2. All of the planar sides 25, 26, 27 and 28 are formed by lapping the facets onto the fiber ends in a manner to be described hereinafter.

The access port of FIG. 1 is formed by holding, or joining, the two fibers together by bonding the planar side 26 of the end portion of the fiber 21 to the planar side 27 of the end portion of the fiber 22. The planar sides 26 and 27 are substantially the same size and shape and are bonded in substantial registration with each other. Once the ends are joined in FIG. 1, the line of intersection 31 of the planar sides of fiber 21 is substantially parallel to and adjacent to the line of intersection 32 of the planar sides of fiber 22. This configuration can be understood more readily with reference to FIG. 2 when the two separated parts are moved together along the dotted lines. The entire two fiber device is called an access port because it provides access into or out of either fiber by way of an elliptically shaped port formed by the planar sides 25 and 28. This elliptical port is a working surface that provides the optical boundary for various materials which control coupling light between the two fibers of the access port without any substantial sensitivity to modes of light being carried in the fibers.

The wedge-shaped end portions of the two fibers are bonded directly together into an integral part confining light transmitted from an optical source 33 and through the fiber 21 exclusively to the fiber 22 without exposing the light to air or other devices such as lenses or prisms. This integral part, or access port, provides a preferable device for developing compact, low-loss fiber optical components for controlling the amount of light transmitted to an optical detector 34 located at the opposite end of the fiber 22.

Fabrication of the Access Port

Figure 2:
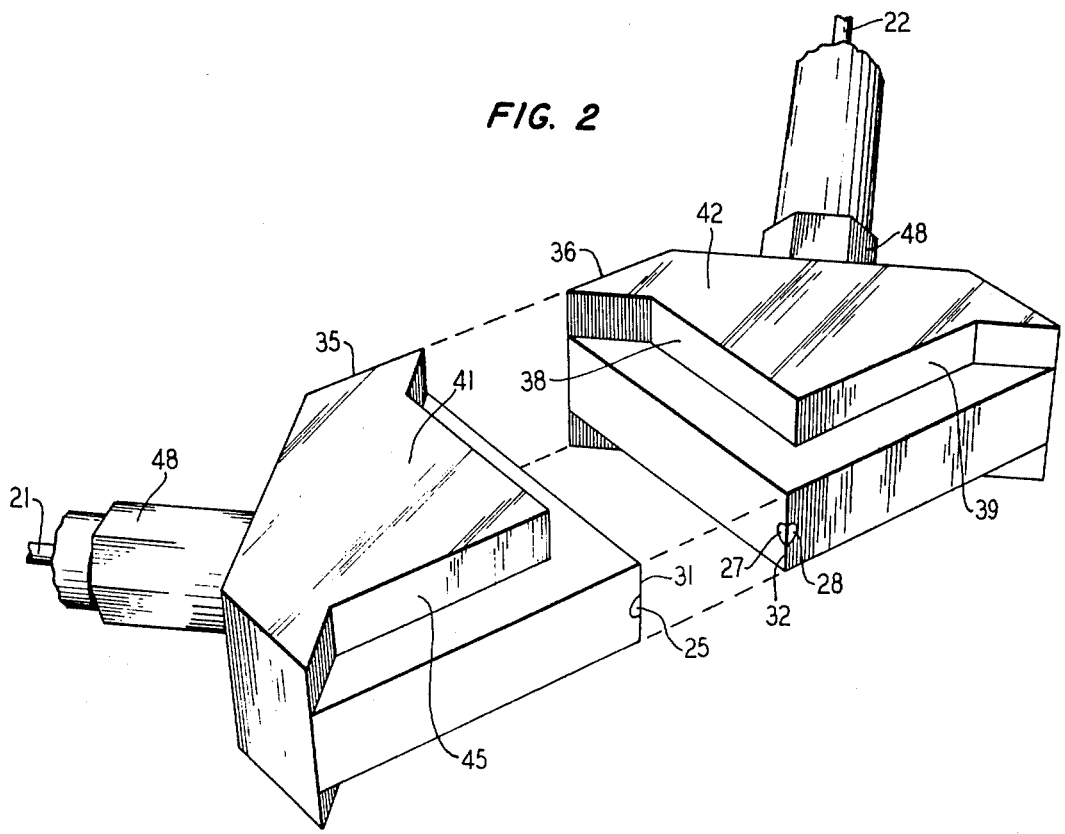
FIG. 2 is a perspective view of parts of an access port together with bodies for holding the fibers thereof.

Now in reference to FIG. 2, there is described a method used for fabricating the access port of FIG. 1. Elements of the access port which are common to both FIGS. 1 and 2 are identified in FIG. 2 with the same designators used in FIG. 1.

Because the fibers 21 and 22 have a very small diameter they may be difficult to hold for shaping and joining. Shaping of the wedges has been accomplished by grinding and polishing the facets onto the ends of the fibers. Holding the fibers 21 and 22 in proper positions for such grinding and polishing has been facilitated by encapsulating the end portions of those fibers in substantially identical precision molded plastic bodies 35 and 36. Dimensions of the bodies 35 and 36 are approximately 1.0 centimeter from corner to corner and approximately 0.5 centimeter thick. Thus the bodies 35 and 36 are much larger than the diameter of the fibers and therefore are much easier to handle for processing.

Planar surfaces in the bodies 35 and 36 are used for aligning and holding those parts. On the body 36 guide surfaces 38 and 39, respectively, are made parallel to the desired planes of the facets 27 and 28. Similar guide surfaces are included in the body 35. Additional planar guide surfaces 41 and 42, respectively, are positioned perpendicular to the desired lines of intersection 31 and 32 of the facets.

With the guide surface 38 pressed against a stop tab, the plane of body 36, which includes facet 27, is ground and polished while the body lies on plane 42. The plane including the facet 26 in body 35 similarly is ground and polished while that body lies on plane 41.

Thereafter, with the bodies continuing to lie on the planes 41 and 42 and guided by the plane 39 and a plane 45, which is similar to plane 39 the bodies are aligned for joining. Precision alignment can be assured by transmitting light from the source 33 into the fiber 21 and through the access port and the fiber 22 to the detector 34, as shown in FIG. 1. When the detector indicates that a maximum signal is received, alignment of the bodies is precise and the two parts are joined. A suitable joint has been made using a cyanoacrylate ester as the bonding compound. Other methods and materials, such as epoxy, acrylic, anerobic and other adhesives, for joining the fibers can be used. The joint, however, should be substantially transparent at the wavelength of light desired to be transmitted. After the bodies 35 and 36 are joined, the planar surfaces 39, 41, 42 and 45 are used for guiding and holding the access port while the planar surface including the facets 25 and 28 is ground and polished. These latter facets form the optical boundary used for coupling light into or out of the fibers 21 and 22 without any substantial sensitivity to modes of light being carried. Thus the basic access port is made ready for application in any one of several devices.

It is noted that the optical fibers are very fine and may be subjected to rough handling during use. A sleeve 48 of metal or other protective material can be molded into each of the bodies 35 and 36 for protecting the fiber at the point of exit from each of those bodies. Additionally, the fibers may be covered with a flexible coating which will fit inside of the sleeve 48 and which will protect the fiber from damage along its entire length.

Figure 3:
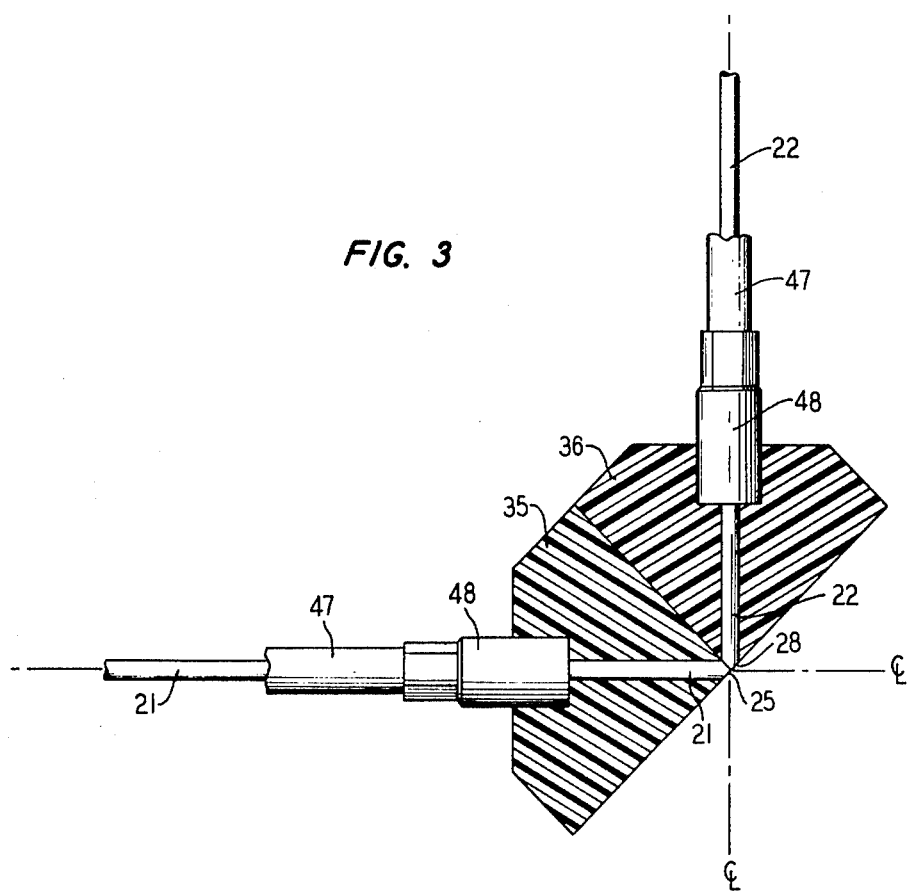
FIG. 3 is a cutaway view of an access port and holders in accordance with FIGS. 1 and 2.

Referring now to FIG. 3, there is shown a cutaway diagram of the two bodies 35 and 36 joined together so that the fibers 21 and 22 are joined at their wedge-shaped ends. The fibers are covered by flexible coating material 47 which is inserted into the protective sleeves 48. Elements of the access port which are common to FIG. 3 and either FIG. 1 or FIG. 2 are given the same designators in FIG. 3 as in FIG. 1 or FIG. 2.

In the access port shown in FIG. 3, it is noted that with respect to the joined facets of the fibers 21 and 22, each is positioned at an acute angle with respect to the longitudinal axis of its respective fiber. Additionally, the facets 25 and 28 which form the optical boundary of the access port are exposed on open faces of the bodies 35 and 36. Each of the boundary facets is positioned at an acute angle with respect to the longitudinal axis of its respective fiber. The longitudinal axes of the fibers are positioned to intersect at the boundary.

Operation of the Access Port

Operation of the access port of FIG. 1 depends upon where and how the port is used. The planar sides, or facets, 25 and 28 form an open, or uncovered, optical boundary which causes light transmitted along the center axis of the fiber 21 toward the boundary to respond in one of several ways, depending upon what substance or material is placed adjacent to the facets 25 and 28 on the other side of the boundary.

For instance, if the access port simply is left open in air, which has a refractive index lower than the refractive index of the core of the fibers, the light transmitted along fiber 21 is reflected internally at the boundary and is further transmitted along the center axis of the fiber 22. Substantially all of the incident light is reflected internally, but because there is a range of angles of incidence a portion of the incident light may be coupled out through the boundary.

Substantial amounts of light can be coupled either out of or into the fibers by way of the access port. To accomplish such coupling, other substances are placed adjacent to the boundary. Several optical devices are suggested by way of additional exemplary embodiments to be described.

Three-Port Devices

Some three-port optical coupling and switching devices are made from the basic access port. In three-port devices, there are ends of three fibers in the device.

Figure 4:
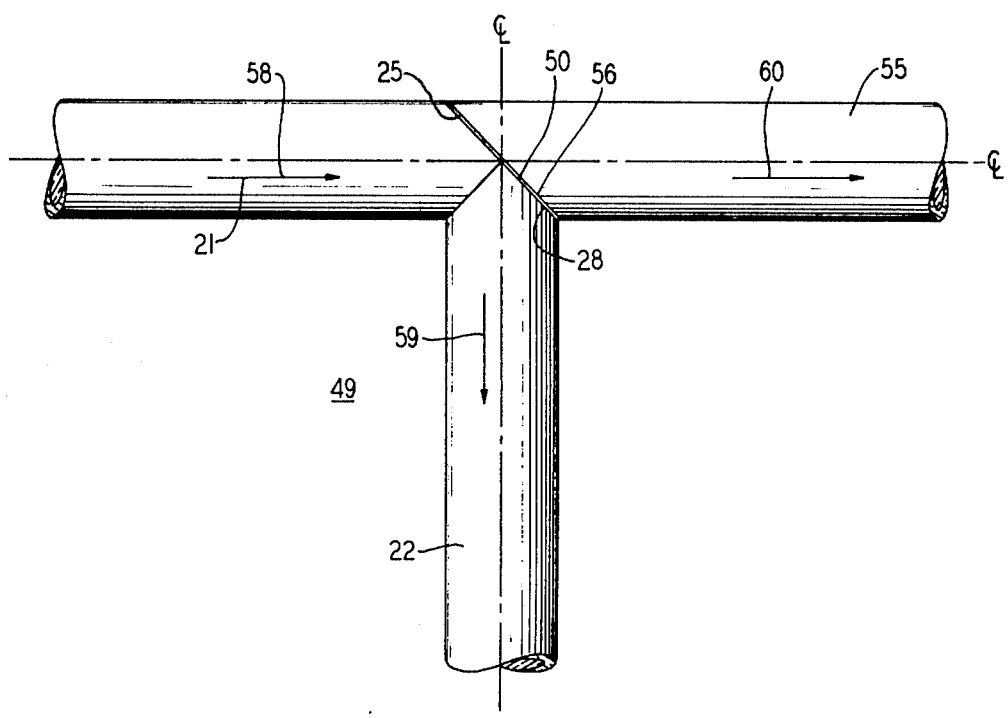
FIG. 4 is a diagram of an optical tap using an access port.

Referring now to FIG. 4, there is shown an access port 49 including fibers 21 and 22. Facets 25 and 28 form a covered, or coated, optical boundary, wherein a thin, partially reflective metallic film 50 is laid on the facets 25 and 28. A third fiber 55 having an end portion shaped into a plane 56, positioned at an acute angle with respect to the longitudinal axis of that fiber, is joined to the reflective film 50.

Light transmitted along fiber 21 in the direction of arrow 58 is partially reflected by the access port along arrow 59 into the fiber 22 and is partially transmitted through the reflective film 50 into the fiber 55 along arrow 60. For typical partially reflective films, most of the optical power transmitted in the fiber 21 is reflected into the fiber 22. A small percentage of the power transmitted in fiber 22 is coupled into fiber 55 without substantial dependence upon the modes of light being transmitted in fiber 21. Therefore, the light in fiber 55 is a faithful sample of the light in fiber 21 which can be used for generating an effective practical control signal for the optical source supplying light to the fiber 21.

Figure 5:
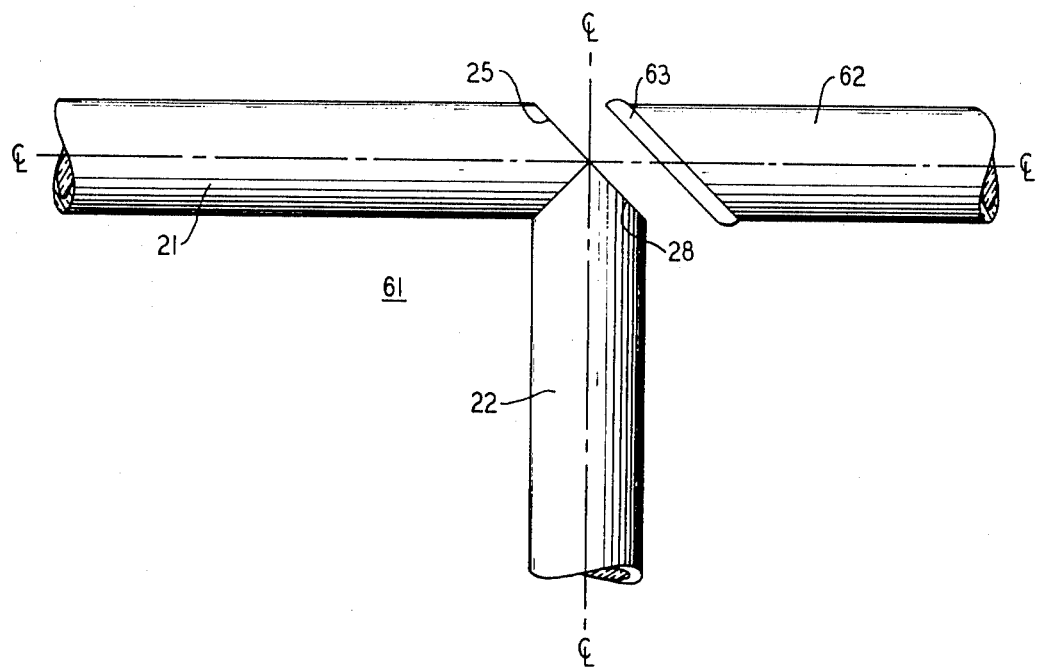
FIG. 5 is a diagram of an optical switch using an access port.

Referring now to FIG. 5, there is shown an optical switch using access port 61 including fibers 21 and 22 with an open boundary at facets 25 and 28. Another optical fiber 62 has a diagonal planar end portion covered with a thin button 63 of refractive index matching material. That is, the refractive index of the button 63 substantially matches the refractive index of the fibers 21, 22 and 62. The button is made of a resilient material that is flexible enough to contact the entire surfaces of the facets 25 and 28 when the fiber 62 is moved to the left sufficiently to close the gap shown in the figure.

The device of FIG. 5 operates as an optical switch for switching light between the access port 61 and the fiber 62. Moving the fiber 62 and the resilient material 63 to the right and left opens and closes the switch. When the gap is opened, light transmitted through fiber 21 to the port is reflected internally by the boundary into the fiber 22. When the gap is closed so that the button 63 contacts the facets 25 and 28, light transmitted in the fiber 21 is coupled through the boundary and the button 63 into the fiber 62. Thus, substantially all of the incident light in the fiber 21 can be switched either into fiber 22 or into fiber 62 by moving the end of fiber 62.

Although it is not shown in FIG. 5, the resilient material can be placed on either side of the gap. When the button is placed on the access port side of the gap, its exposed surface should be both substantially planar and located in the position where facets 25 and 28 are located in FIG. 5.

Four-Port Devices

Some four-port optical coupling and switching devices also are made from the basic access port. These devices include the ends of four fibers which are arranged to crosswise intersect with each other in the coupling area.

Figure 6:
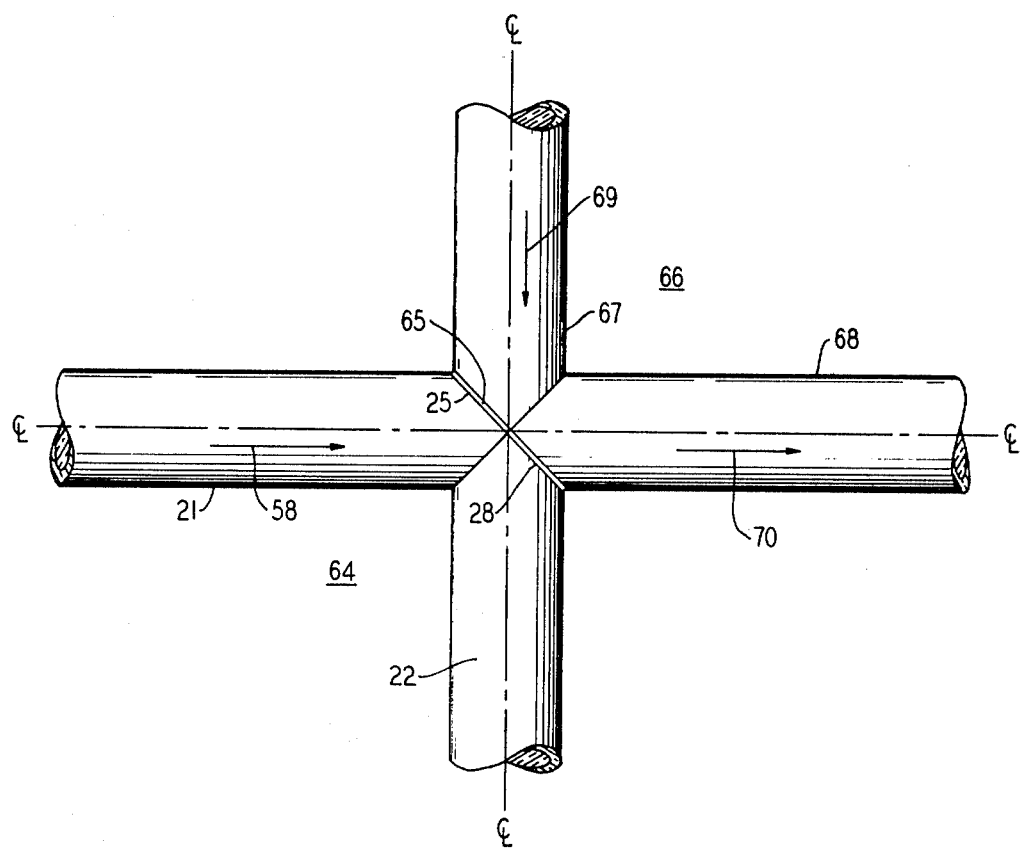
FIG. 6 is a diagram of an optical multiplex/demultiplex or a beamsplitter using an access port.

Referring now to FIG. 6, there is shown a multiplex/demultiplex device having an access port 64 including the fibers 21 and 22 with a dichroic film 65 laid on the facets 25 and 28. Another access port 66 including fibers 67 and 68 has an optical boundary joined to the film 65.

The ends of the four fibers intersect crosswise in the coupling area.

This device of FIG. 6 is arranged as a wavelength multiplex/demultiplex. Dichroic film 65 reflects incident light of a first wavelength and transmits incident light of a second wavelength. Therefore, light of the first wavelength transmitted along arrow 69 in fiber 67 is reflected by the film 65 into the fiber 68 along arrow 70. Light of the second wavelength transmitted in fiber 21 along arrow 58 is transmitted through the film 65 into the fiber 68 also along arrow 70. Thus the incident light of both wavelengths is multiplexed in the fiber 68.

These same wavelengths of light, when reversed in direction in the fiber 68, will be demultiplexed at the boundary between access port 64 and 66 so that the light of the first wavelength reflects into fiber 67 and the light of the second wavelength is transmitted into fiber 21.

The four-port arrangement shown in FIG. 6 also can be used as a beamsplitter by substituting a standard partially reflective film on the surface of the optical boundary for the dichroic film just described. One type of partially reflective film which may be used is a metallic film. This beamsplitter transmits light from the fiber 21 to the fiber 68 and a far end receiver while a portion of the light in fiber 21 is reflected into fiber 22. The light reflected into fiber 22 is substantially mode insensitive and is useful for generating a control signal for the optical source. Light received from the far end of the fiber 68 is partially reflected into the fiber 67 and a detector. Thus the beamsplitter enables both transmitting and receiving on the single optical fiber 68.

Figure 7:
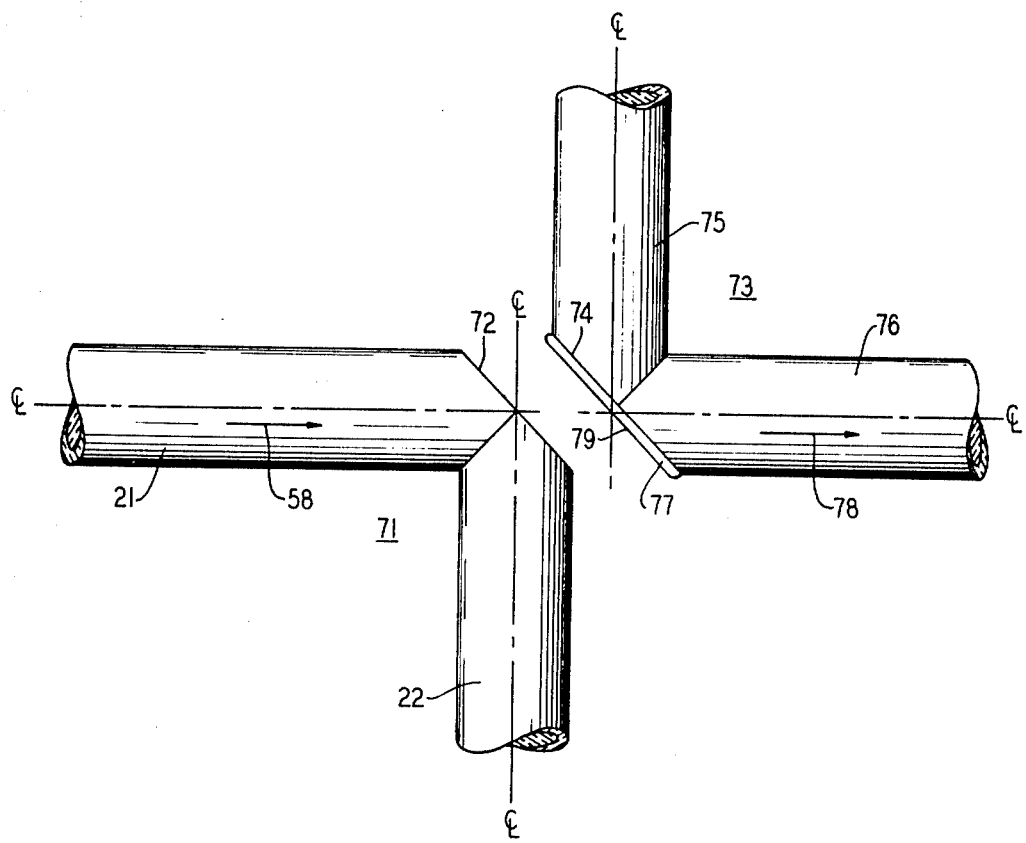
FIG. 7 is a diagram of an optical switch using a pair of access ports.

Referring now to FIG. 7, there is shown an optical switch having an access port 71 including fibers 21 and 22 with an open optical boundary 72. Another access port 73 including fibers 75 and 76 has a resilient button 77 with a matching refractive index laid on a boundary 74 of the port 73. A gap is open between the boundary 72 of port 71 and the exposed surface 79 of the button 77 of the port 73. The boundary 74 of the access port 73 is relieved sufficiently to accommodate the button 77. When the gap is closed, the intersection of the axes of the fibers 75 and 76 lies in the exposed surface 79 of the resilient button 77.

Moving the access port 73 to the right and left opens and closes the switch. Opening and closing the gap causes light to switch between the access ports 71 and 73. For instance, incident light transmitted along arrow 58 in fiber 21 is reflected into fiber 22 when the gap is open. When the gap is closed, that same incident light is coupled through the boundary 72 of port 71, the button 77, and the boundary 74 of port 73 into the fiber 76 along arrow 78. Also when the gap is closed, any incident light in the fiber 75 is coupled through the boundary 74, the button 77 and the boundary 72 of the access port 71 into the fiber 22.

Other Devices

Some other devices also have been devised by using the access port for controlling optical signals in other ways.

Figure 8:
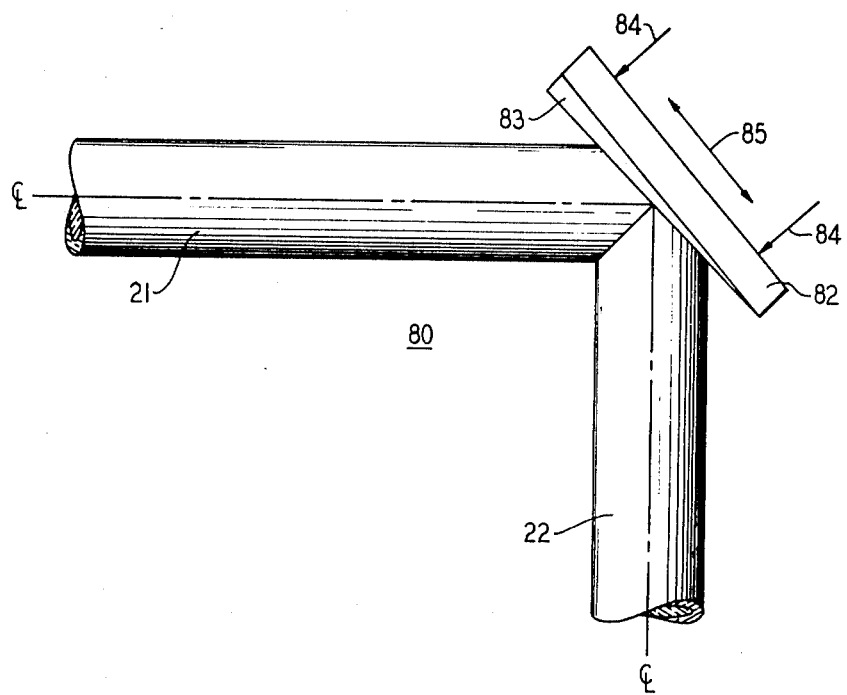
FIG. 8 is a diagram of an optical attenuator using an access port.

Referring now to FIG. 8, there is shown an optical attenuator having an access port 80 including the pair of fibers 21 and 22. The optical boundary of the port 80 is open, that is, without any material deposited thereupon. A moveable piece 82 of material has a coating 83 of partially reflective film covering a planar area larger than the area of the boundary in the port 80. Advantageously, the planar area covered by the film is much larger than the area of the optical boundary. The coating 83 is deposited so that the reflectance of the film varies across the piece 82. In FIG. 8 the varying reflectance is shown as varying thickness of the coating 83.

The piece 82 is held by exemplary forces 84 so that the partially reflective material is adjacent to the optical boundary. As the piece 82 is moved back and forth along the arrow 85 so as to change the reflectance of the film located adjacent to the optical boundary, different amounts of light are coupled from the fiber 21 through the film 83 to the piece 82. For different positions of the piece 82, differing amounts of light are reflective into fiber 22 for transmission to another device such as an optical detector. This attenuator shown in FIG. 8 advantageously can adjust the magnitude of power transmitted to the device along fiber 22. This light reflected into the fiber 22 is substantially mode insensitive.

Figure 9:
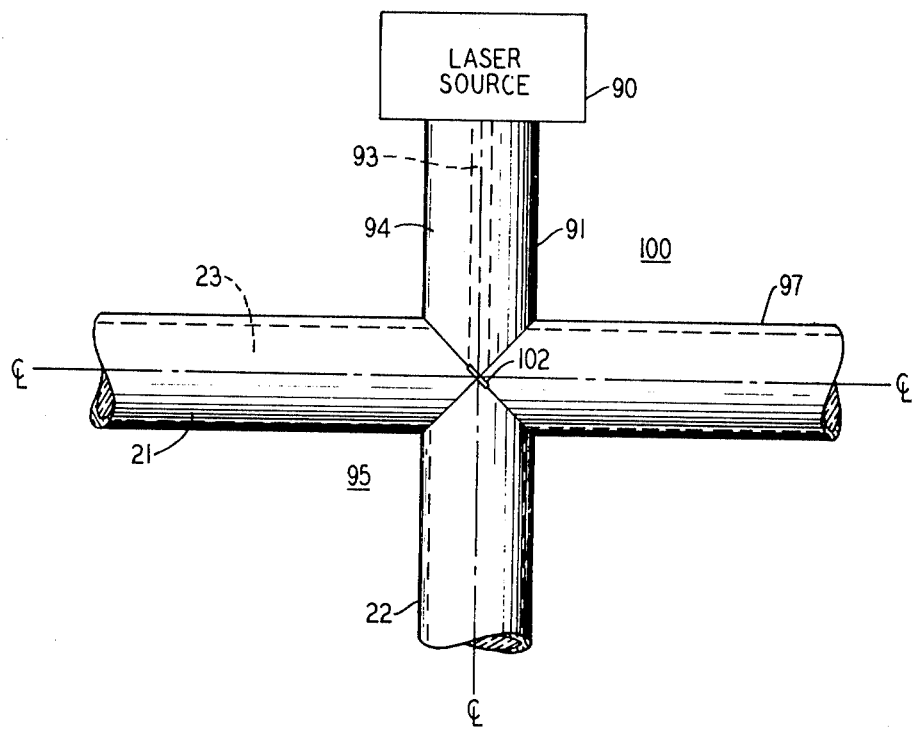
FIG. 9 is a diagram of a two-way transmission device using a pair of access ports.

Referring now to FIG. 9, there is shown a two-way transmission device with a laser source 90 which is arranged to transmit into a single mode fiber 91. The fiber 91 has a relatively small diameter center core 93. The center core 93 is much smaller in diameter than the center cores of the multimode fibers described hereinbefore. The outer diameter of cladding 94 of the fiber 91 is substantially the same as the outer diameter of the cladding of the previously described multimode fibers.

In FIG. 9, an access port 95 includes multimode fibers 21 and 22 having an optical boundary. The single mode fiber 91 together with another multimode fiber 97 form a second access port 100 also having an optical boundary. A dot 102 of highly reflective film is placed on the boundary of access port 100 substantially in registration with the extended center core 93 of fiber 91. Thus, the dot, or spot, 102 intersects with an extension of the core 93.

Thus, light generated by the laser source 90 is largely reflected by the dot 102 into the fiber 97 which is used as a transmission facility. A small percentage of light generated by the laser source 90 is coupled through the boundary to the fiber 22. This light coupled into fiber 22 is substantially mode insensitive and is useful for generating a control signal for the laser 90.

Light received from the fiber 97 is transmitted almost entirely straight through the boundaries to the fiber 21 where it is coupled to an optical detector. The reflective dot 102 only partially obstructs the received optical signals which are coupled around that dot through the tips of the fibers 21, 22 and 97. In fiber 91, the received signal is coupled through the tip region of the cladding 94 which is little enough material that the received signal passes therethrough substantially undisturbed.

Figure 10:
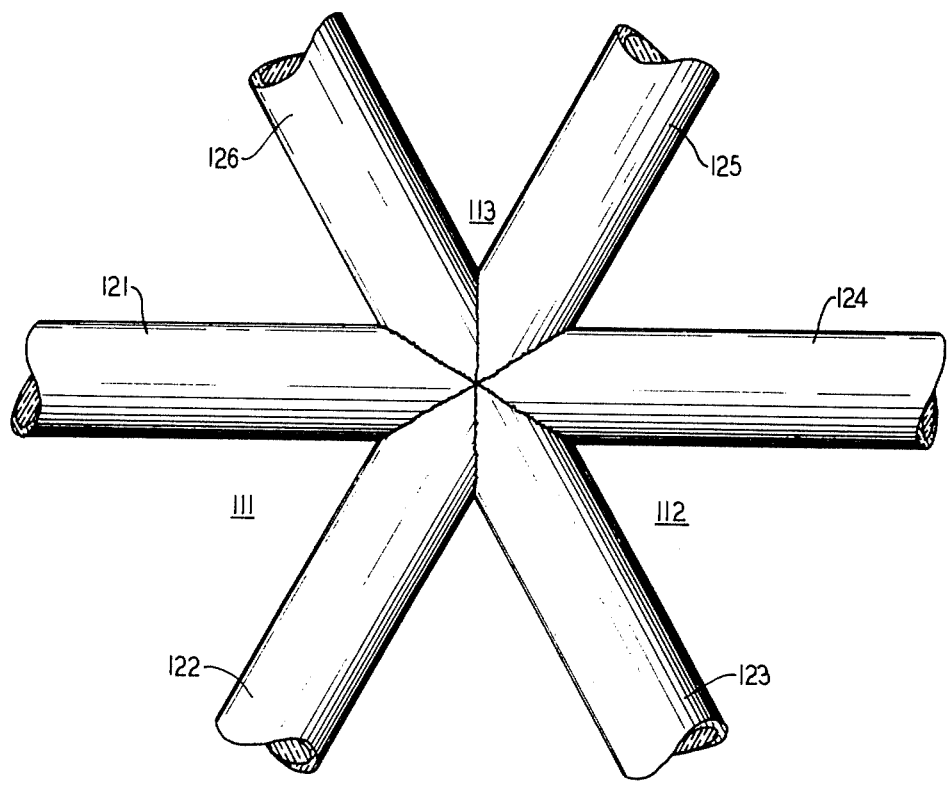
FIG. 10 is a diagram of an optical distribution device using plural access ports.

Referring now to FIG. 10, there is shown an optical multibranch distribution device for coupling an incident optical signal into two or more other fibers. Three optical access ports 111, 112 and 113 are shown in FIG. 10 for coupling incident light from one multimode fiber 121 into five other multimode fibers 122, 123, 124, 125 and 126. Each of the access ports 111, 112 and 113 includes two fibers with wedge-shaped end portions as previously described. The planar surfaces at each tip are not only ground and polished but also are slightly scribed, grooved, or otherwise roughened thereafter so that incident light from the fiber 121 is diffused into the other fibers. The flat, scribed, or roughened surfaces at the tips of the fibers are all joined, or bonded, together.

Although most of the access ports described herein have fibers positioned at right angles with one another and have individual facets positioned at right angles with one another, such right angles are not considered to be essential. Optimum angles for the wedges at the tips depend upon the refractive index of the fibers and the desired device operation. It is noted, however, that in general adjacent facets which are joined, or bonded, are substantially the same shape and size. The fibers are joined with the adjacent facets in substantial registration with each other.

Although the access ports disclosed hereinbefore use multimode fibers, similar access ports can use single mode fibers. Also materials deposited on an optical boundary, generally can be deposited on either of two adjacent optical boundaries. The direction of light propagation can be reversed even though it is shown typically in one direction through the described access ports.

The above detailed description is illustrative of several embodiments of the invention, and it is to be understood that additional embodiments thereof will be obvious to those skilled in the art. The embodiments described herein, together with those additional embodiments, are considered to be within the scope of the invention.

What is claimed is:

1. A device comprising
    a first fiber having a first longitudinal center axis and a first wedge-shaped end portion with two planar sides, each planar side of the first end portion intersecting the first center axis at an acute angle,
    a second fiber having a second longitudinal center axis and a second wedge-shaped end portion with two planar sides, each planar side of the second end portion intersecting the second center axis at an acute angle, and
    means for holding one planar side of the first end portion against one planar side of the second end portion, so that the first center axis intersects the second center axis.

2. A device in accordance with claim 1 wherein the second planar sides of the end portions of the first and second fibers form an optical boundary.

3. A device in accordance with claim 2 further comprising
    a piece of material having a coating of partially reflective material on one planar side, and
    means for holding the partially reflective material adjacent to the optical boundary.

4. A device in accordance with claim 3 wherein the coating has a reflectance which varies across the piece, and
    the holding means is arranged for moving the piece to change the position of reflective material adjacent to the optical boundary.

5. A device in accordance with claim 1 wherein the planar sides of the first and second fibers include a plurality of grooves for diffusing any light incident thereto.

6. A device in accordance with claim 1 further comprising
    means positioned adjacent to a second end of the first fiber for transmitting light into the second end of the first fiber, and
    means positioned adjacent to a second end of the second fiber for detecting light transmitted through the first and second fibers.

7. A device in accordance with claim 1 wherein the two planar sides held together are substantially the same size and shape and are held substantially in registration with each other.

8. A device comprising
    a first fiber having a first wedge-shaped end portion with two planar sides intersecting in a first line,
    a second fiber having a second wedge-shaped end portion with two planar sides intersecting in a second line, and
    means for holding one of the planar sides of the first end portion against one of the planar sides of the second end portion, the first and second lines being substantially parallel and adjacent to each other.

9. A device in accordance with claim 8 wherein the planar sides of the first and second fibers are roughened.

10. A device in accordance with claim 8 further comprising
    means positioned adjacent to a second end of the first fiber for transmitting light into the second end of the first fiber, and
    means positioned adjacent to a second end of the second fiber for detecting light transmitted through the first and second fibers.

11. A device comprising
    a first fiber having a first planar surface positioned at an acute angle with respect to a longitudinal axis of the first fiber,
    a second fiber having a second planar surface positioned at an acute angle with respect to a longitudinal axis of the second fiber,
    means for holding the first planar surface against the second planar surface, and
    the first and second fibers having a common third planar surface positioned at an acute angle with respect to the longitudinal axes of the first and second fibers.

12. A device in accordance with claim 11 further comprising
    a partially reflective coating disposed on the third planar surface,
    a third fiber having a fourth planar surface positioned at an acute angle with respect to the longitudinal axis of the third fiber,
    a fourth fiber having a fifth planar surface positioned at an acute angle with respect to the longitudinal axis of the fourth fiber,
    means for holding the fourth planar surface against the fifth planar surface,
    the third and fourth fibers having a common sixth planar surface positioned at an acute angle with respect to the longitudinal axes of the third and fourth fibers, and
    means for holding the sixth planar surface against the partially reflective coating on the third planar surface.

13. A device in accordance with claim 11 further comprising
    a partially reflective film disposed on the third planar surface,
    a third fiber having a fourth planar surface positioned at an acute angle with respect to the longitudinal axis of the third fiber, and
    means for holding the fourth planar surface against the partially reflective film on the third planar surface.

14. A device in accordance with claim 11 further comprising a third fiber having a fourth planar surface positioned at an acute angle with respect to the longitudinal axis of the third fiber, index matching material disposed between the third and the fourth planar surfaces, and means for opening a gap between the third and fourth planar surfaces.

15. A device in accordance with claim 14 further comprising means for closing the gap between the third and fourth planar surfaces.

16. A device in accordance with claim 11 further comprising a dichroic film disposed on the third planar surface, a third fiber having a fourth planar surface positioned at an acute angle with respect to a longitudinal axis of the third fiber, and means for holding the fourth planar surface against the dichroic film on the third planar surface.

17. A device in accordance with claim 11 further comprising a dichroic film disposed on the third planar surface, a third fiber having a fourth planar surface positioned at an acute angle with respect to a longitudinal axis of the third fiber, a fourth fiber having a fifth planar surface positioned at an acute angle with respect to a longitudinal axis of the fourth fiber, means for holding the fourth planar surface against the fifth planar surface, the third and fourth fibers having a common sixth planar surface positioned at an acute angle with respect to the longitudinal axes of the third and fourth fibers, and means for holding the sixth planar surface against the dichroic film on the third planar surface.

18. A device comprising first and second access ports, the first access port including first and second fibers joined and forming a first optical boundary, the second access port including third and fourth fibers joined and forming a second optical boundary, a refractive index matching material disposed on the first optical boundary, and means for moving the second optical boundary with respect to the index matching material.

19. A device comprising first and second access ports, the first access port including first and second multimode fibers joined and forming a first optical boundary, the second access port including a third multimode fiber and a single mode fiber joined and forming a second optical boundary, the single mode fiber having a core, and a spot of reflective film placed on the second optical boundary at a position intersecting with the core of the single mode fiber extended.

20. An optical device for coupling light between a pair of optical fibers, each fiber having a wedge-shaped end portion with two planar sides, one planar side of one end portion being joined to one planar side of the other end portion and the second planar side of each end portion forming a common planar optical boundary, the device being characterized by a partially reflective metallic film disposed on the common planar optical boundary and the common planar optical boundary being substantially mode insensitive to whatever light is coupled between the fibers.

* * * * *